Oct. 29, 1935.  O. G. NORDBERG  2,018,968
BRAKE
Filed Dec. 30, 1932
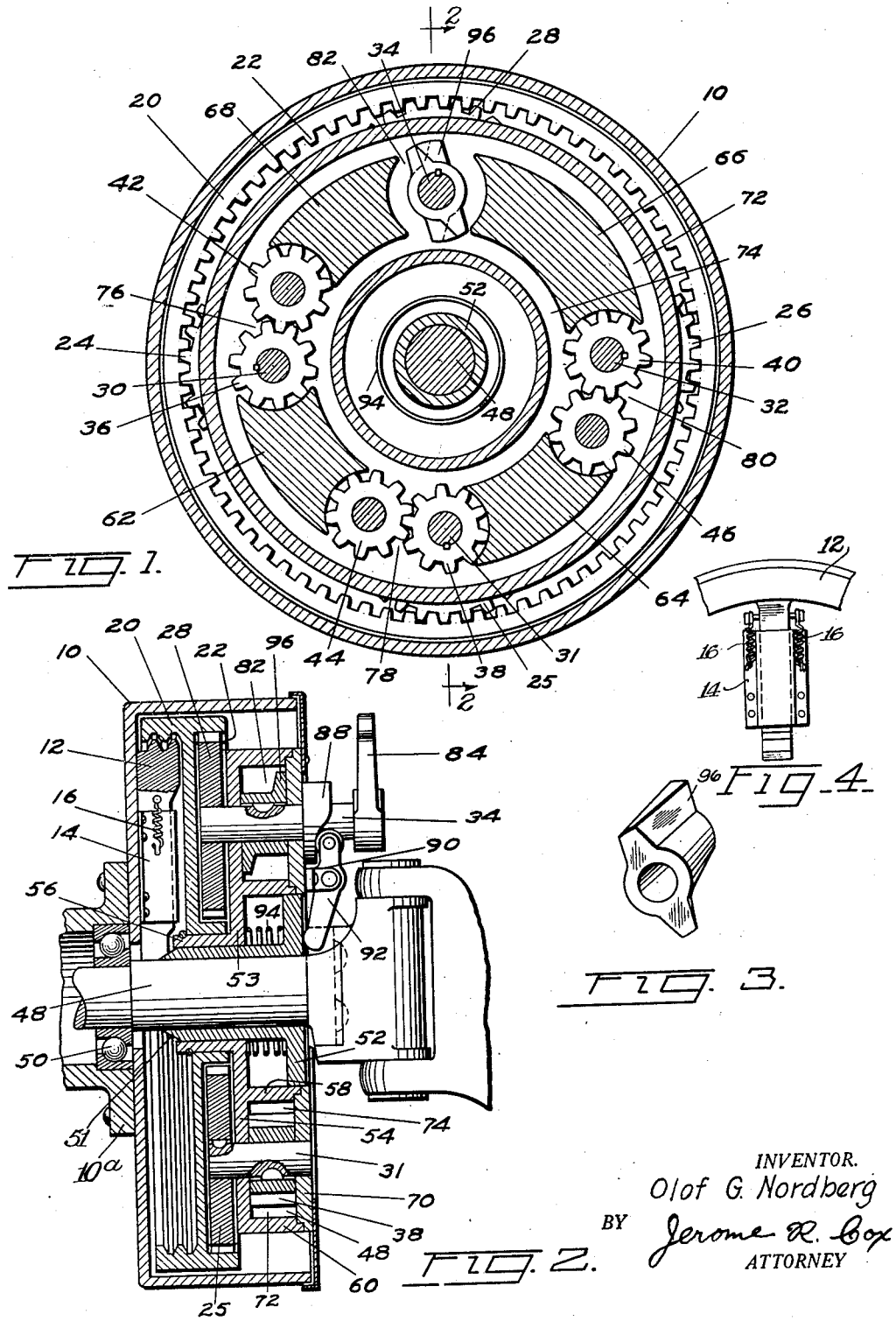
INVENTOR.
Olof G. Nordberg
BY Jerome R. Cox
ATTORNEY Patented Oct. 29, 1935

2,018,968

UNITED STATES PATENT OFFICE 2,018,968

BRAKE

Olof G. Nordberg, Denver, Colo., assignor to Bendix Aviation Corporation, South Bend, Ind., a corporation of Delaware Application December 30, 1932, Serial No. 649,619

6 Claims. (Cl. 188—92)

This invention relates to brakes and particularly to hydraulic brakes for automobiles in which the resistance encountered by a liquid driven through a restricted orifice is utilized to retard the vehicle.

Prior hereto it has been proposed to pump liquid through a restricted passage to retard an automotive vehicle, the motion for driving the pump being derived from the wheel of the vehicle. Usually however, it has been proposed to drive the pump continuously. Such structure is, of course, open to the disadvantage that a portion of the energy normally developed primarily for driving the vehicle is therein diverted to driving the pump.

Should a structure be provided in which a pump is arranged to pump liquid through a fixed restricted passage only when braking, the disadvantage of the loss of energy while driving the vehicle would be avoided. However, it would be impossible to control the retarding effort developed (i. e. the operator could not vary the rate of braking).

One of the objects of this invention is to provide an efficient brake in which there is substantially no wear.

A further object is to provide an improved hydraulic brake of the type in which a pump is driven by the wheel of the vehicle and in which the pump is normally inactive but may, at the will of the operator, be connected with the wheel through a clutch.

A further object is to provide in combination with such a structure means whereby the mechanism effective to operate the clutch is also effective to regulate a valve controlling the restricted passage.

Further objects and features of the invention will be apparent after a reading of the subjoined specification and claims and after consideration of the accompanying drawing, in which:

Figure 1 is a view in vertical section of a vehicle wheel equipped with a brake constructed according to my invention;

Figure 2 is another view in vertical section taken substantially on the line 2—2 of Figure 1;

Figure 3 is a view in perspective showing the valve or gate by means of which the size of the passage is restricted; and Figure 4 is a view in section showing more clearly the shape of the shoe 12.

Referring specifically to the drawing, there is shown a drum 10 adapted to rotate with a road wheel to which it is secured. A shoe 12 is adapted to slide radially of the drum in a sleeve 14 secured to the drum. The shoe 12 thus rotates with the drum. It is normally maintained in the position shown by a spring 16.

The drum 10 may at any time at the will of the operator and through the medium of the shoe 12 be clutched to drive a series of hydraulic pumps. The outer end of the shoe 12 is formed with teeth adapted to engage corresponding clutch teeth which extend circumferentially around the inner surface of a gear drum 20. The gear drum 20 is internally formed laterally of the clutch teeth with gear teeth 22. The teeth 22 thus form an internal ring gear and mesh with and are adapted to drive a plurality of gears 24, 25, 26, and 28. The gears 24, 25, and 26 are secured to shafts 30, 31, and 32 respectively and the shafts also carry and drive pump gears 36, 38, and 40. The gear 28 is rotatably mounted on the shaft 34. The pump gears 36, 38, and 40 mesh with and drive cooperating pump gears 42, 44, and 46.

The drum 10 and the wheel or other part such as the member 10ᵃ associated therewith are mounted to turn upon a stub axle 48, antifriction balls such as 50 being provided where desired. The axle 48 is surrounded by a slidable sleeve or collar 52 and surrounding the collar is a member 53 having an annular plate portion 54 and formed with ring flanges 56, 58, and 60 and with integral projections 62, 64, 66, and 68. The flanges 58 and 60 and the projections 62, 64, 66, and 68 are secured to an annular backing plate 70 and together with the backing plate provide a pair of annular passages 72 and 74, the passages being connected by openings 76, 78, 80, and 82.

The openings 76, 78, and 80 are shaped to conform to the pumps formed by the gears 36—42, 38—44, and 40—46, the pumps being housed in said openings respectively. The pumps are adapted when being driven to draw liquid from the passage 72 and force it into the passage 74. The liquid may normally pass freely from the passage 74 to the passage 72 through the opening 82.

Means are provided under the control of the operator for engaging the clutch and causing the pumps to be driven by the drum. A lever 84 is connected to means such as a foot pedal positioned conveniently for operation by the operator. The lever 84 is secured to a cam shaft 34, the latter carrying an annular cam 88 and being mounted for rotation in the backing plate 70. Pivotally mounted on a bracket 90 secured to the backing plate 70 is a lever 92 having one end acted on by the cam and having the other end adapted to bear upon one end of the sleeve 52. The other end of the sleeve 52 is conical in shape as shown at 51 and is adapted to contact with the inner end of the shoe 12. As may be clearly seen, longitudinal movement of the sleeve forces the shoe into engagement with the gear drum 20. This is frictional engagement and not interlocking, but after the engagement the two drums rotate substantially as a unit. A spring 94 serves to return the sleeve to its normal position.

Means are also provided for controllably restricting the effective size of the opening 82. The shaft 34 extends through the backing plate 70 into the opening 82 and has secured thereto within the opening a valve member 96 formed with helical vanes. By reason of the helical shape of the vanes of the valve 96, it is possible to close the orifice more gradually than would be possible were it not for the helical shape. Thereby it is possible to restrict the orifice quickly at first and thereafter to continue the closing at a much slower rate.

It is believed that the operation of the brake will be clear from the above description. Actuation of the lever 84 rotates the cam 88 and through the lever 92 moves the sleeve 52 longitudinally of the axle 48. This forces the shoe 12 into contact with the gear drum 20 and causes rotation of said gear drum 20. The rotation operates the pumps and draws liquid from the passage 72 to the passage 74. Combined movement of the lever 84 restricts the passage 82 any desired amount and thus brakes the wheel as desired.

It is to be understood that the above described embodiment is for the purpose of illustration only and various changes may be made therein without departing from the spirit and scope of the invention.

I claim:

1. In a braking system, a fluid pump, a rotating member to be braked, means for driving said pump from said rotating member, and passages forming a continuous circuit and including a restricted opening through which fluid may be forced by said pump, said opening being provided with a valve having helical vanes and said valve being mounted upon a shaft for rotation about the axis of the shaft but being prevented from longitudinal movement along said axis.

2. In a braking system, a fluid pump, a rotating member to be braked, means for driving said pump from said rotating member, and passages forming a continuous circuit and including a restricted opening through which fluid may be forced by said pump, said driving means including a rotating drum associated with said rotating member and a clutch and said clutch comprising a shoe slidably mounted on the rotating drum and a normally stationary gear drum with which said shoe is adapted at times to engage.

3. In a braking system, a rotating member to be braked, a normally stationary ring gear associated therewith, a plurality of gear pumps driven by said ring gear, a passage from which said pumps draw liquid, a passage to which said pumps supply liquid, an opening through which liquid may flow from said last named passage to said first named passage, means for selectively restricting said opening, and a clutch for at times connecting said rotating member and said ring gear.

4. In a braking system, a fluid pump, a rotating member to be braked, an axle about which said member rotates, a clutch for connecting said pump and said rotating member, and means for operating said clutch comprising a sleeve surrounding said axle, a stationary support, a lever pivoted on said support, and bearing against said sleeve, a shaft rotatably mounted in said support, an annular cam secured to said shaft and bearing on said lever, and means for rotating said shaft.

5. In a braking system, a fluid pump, a rotating member to be braked connected to said pump to drive said pump, a member formed with a continuous passageway through which fluid is forced by said pump, a valve for selectively restricting said passageway comprising a rotatable member equipped with vanes, and means for operating said valve comprising a shaft connected thereto and a lever secured to said shaft, said member being prevented from moving longitudinally along the axis of said shaft.

6. In a braking system, a fluid pump, a rotating member to be braked connected to said pump to drive said pump, a member formed with a continuous passageway through which fluid is forced by said pump, a valve for selectively restricting said passageway comprising a rotatable member equipped with vanes, and means for operating said valve comprising a shaft connected thereto and a lever secured to said shaft, the connection between the rotating member and the pump including a clutch, and the shaft being provided with a cam for operating said clutch.

OLOF G. NORDBERG.